United States Patent
Komma et al.

[11] Patent Number: 5,301,182
[45] Date of Patent: Apr. 5, 1994

[54] OPTICAL PICKUP HEAD

[75] Inventors: Yoshiaki Komma, Kyoto; Seiji Nishino, Osaka; Yoshikazu Hori, Tokyo, all of Japan

[73] Assignee: Matsushita Electric Industrial, Co., Ltd., Osaka, Japan

[21] Appl. No.: 868,939

[22] Filed: Apr. 16, 1992

[30] Foreign Application Priority Data

Apr. 17, 1991 [JP] Japan .................. 3-085089

[51] Int. Cl.$^5$ .................................................. G11B 7/00
[52] U.S. Cl. .................................. 369/103; 369/44.12; 369/44.23; 369/112
[58] Field of Search .............. 369/100, 103, 106, 110, 369/44.12, 44.23; 359/1, 12, 15, 19, 30

[56] References Cited

U.S. PATENT DOCUMENTS

| | | | |
|---|---|---|---|
| 3,911,230 | 10/1975 | Neidell | 369/103 |
| 4,358,200 | 11/1982 | Heemskerk et al. | 356/123 |
| 4,823,335 | 4/1989 | Shikama et al. | 369/112 |
| 4,929,823 | 5/1990 | Kato et al. | 369/44.23 |
| 5,101,389 | 3/1992 | Ohuchida et al. | 369/44.12 |
| 5,185,731 | 2/1993 | Takahashi | 369/44.12 |

FOREIGN PATENT DOCUMENTS

| | | |
|---|---|---|
| 0339722 | 11/1989 | European Pat. Off. . |
| 2601174 | 1/1988 | France . |
| 56-57013 | 5/1981 | Japan . |
| 63-191328 | 8/1988 | Japan . |
| 1-317250 | 12/1989 | Japan . |
| 2-162541 | 6/1990 | Japan . |
| 3-125340 | 5/1991 | Japan . |
| 3-130939 | 6/1991 | Japan . |

OTHER PUBLICATIONS

"New Small Optical Pickup For Laserdisc (1)" by H. Kanamaru et al., ITEC'90, pp. 145–146.
"New Small Optical Pickup For Laserdisc (2)" by H. Kanamaru et al., ITEC'90, pp. 147–148.

*Primary Examiner*—Constantine Hannaher
*Assistant Examiner*—Kiet T. Nguyen
*Attorney, Agent, or Firm*—Lowe, Price, LeBlanc & Becker

[57] ABSTRACT

An optical pickup head for operating on an information recording medium includes a light source for emitting a light beam. A transparent base plate has opposite surfaces formed with a semitransparent film and a hologram respectively. The semitransparent film is exposed to the light beam emitted from the light source, and reflects a portion of the light beam emitted from the light source. The portion of the light beam which is reflected by the semitransparent film forms a forward light beam. A condenser optical system serves to focus the forward light beam on the information recording medium. The forward light beam is reflected at the information recording medium, and forms a backward light beam. The backward light beam successively passes through the condenser optical system, the semitransparent film, and the transparent base plate, and then reaches the hologram. The hologram generates a backward +1-order diffraction light beam from the backward light beam. A plurality of photodetectors serve to receive the +1-order diffraction light beam and to convert the received +1-order diffraction light beam into corresponding electric signals respectively.

10 Claims, 13 Drawing Sheets

OPTICAL PICKUP HEAD

BACKGROUND OF THE INVENTION

This invention relates to an optical pickup head for optically reproducing, recording, or erasing information from or on an optical or magneto-optical recording medium.

An optical recording medium such as an optical disk is formed with a pattern of a groove or pits which represents recorded information. Some optical pickup heads are used in reproducing information from such an optical recording medium. In general, the optical pickup head applies a laser light beam to the optical recording medium and detects the laser light beam reflected back from the optical recording medium. Since the reflected laser light beam depends on a pattern on the optical recording medium, the reflected laser light beam represents information on the optical recording medium. Thus, the detection of the reflected laser light beam enables the reproduction of the information.

As will be explained later, prior art optical pickup heads have some problems.

SUMMARY OF THE INVENTION

It is an object of this invention to provide an improved optical pickup head.

A first aspect of this invention provides an optical pickup head for operating on an information recording medium which comprises a light source for emitting a light beam; a transparent base plate having opposite surfaces formed with a semitransparent film and a hologram respectively, wherein the semitransparent film is exposed to the light beam emitted from the light source, and reflects a portion of the light beam emitted from the light source, wherein the portion of the light beam which is reflected by the semitransparent film forms a forward light beam; a condenser optical system for focusing the forward light beam on the information recording medium, wherein the forward light beam is reflected at the information recording medium, and forms a backward light beam; wherein the backward light beam successively passes through the condenser optical system, the semitransparent film, and the transparent base plate, and then reaches the hologram, and wherein the hologram generates a backward +1-order diffraction light beam from the backward light beam; and a plurality of photodetectors for receiving the +1-order diffraction light beam and converting the received +1-order diffraction light beam into corresponding electric signals respectively.

A second aspect of this invention provides an optical pickup head for operating on an information recording medium which comprises a light source for emitting a linearly-polarized light beam; a transparent base plate having opposite surfaces formed with a polarization reflecting film and a hologram respectively, wherein the polarization reflecting film is exposed to the linearly-polarized light beam emitted from the light source, and essentially totally reflects the linearly-polarized light beam emitted from the light source, wherein the linearly-polarized light beam which is reflected by the polarization reflecting film forms a forward linearly-polarized light beam; a condenser optical system disposed between the polarization reflecting film and the information recording medium; a quarter-wave plate disposed between the polarization reflecting film and the information recording medium; wherein the forward linearly-polarized beam light is changed in polarity by the quarter-wave plate and is focused on the information recording medium by the condenser optical system, and is then reflected at the information recording medium and forms a backward light beam; wherein the quarter-wave plate changes the backward light beam in polarity to enable the backward light beam to pass through the polarization reflecting film; wherein the backward light beam passes through the condenser optical system, the quarter-wave plate, the polarization reflecting film, and the transparent base plate, and then reaches the hologram, and wherein the hologram generates a backward +1-order diffraction light beam from the backward light beam; and a plurality of photodetectors for receiving the +1-order diffraction light beam and converting the received +1-order diffraction light beam into corresponding electric signals respectively.

A third aspect of this invention provides an optical pickup head for operating on an information recording medium which comprises a light source for emitting a first forward light beam; a semitransparent member exposed to the first forward light beam and reflecting a portion of the first forward light beam which forms a second forward light beam; means for focusing the second forward light beam on the information recording medium, wherein the second forward light beam is reflected at the information recording medium, and forms a backward light beam; a hologram for receiving the backward light beam, and generating a backward +1-order diffraction light beam from the backward light beam; and means for detecting the backward +1-order diffraction light beam.

DESCRIPTION OF THE PRIOR ART

Figure 1:
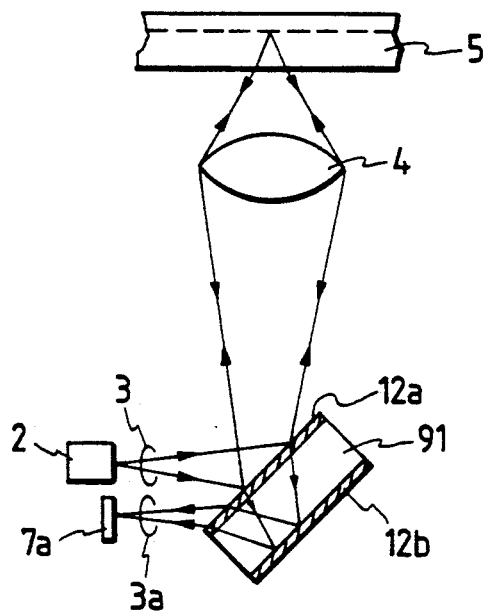
FIG. 1 is a diagram of a first prior art optical pickup head.

With reference to FIG. 1, a first prior art optical pickup head includes a light source 2 such as a semiconductor laser. The light source 2 emits a forward light beam 3 toward a semitransparent film 12a. The forward light beam 3 is reflected at the semitransparent film 12a, being incident to an objective lens 4 and being focused by the objective lens 4 into a spot on an information recording medium 5. The semitransparent film 12a is formed on the front surface of a uniform-thickness flat plate (an astigmatism introducing plate) 91.

The forward light beam 3 is reflected at the information recording medium 5, forming a backward light beam 3a which moves back through the objective lens 4 and then enters the flat plate 91 via the semitransparent film 12a. The backward light beam 3a advances in the flat plate 91, and then reaches a reflection film 12b formed on the rear surface of the flat plate 91. The backward light beam 3a is reflected at the reflection film 12b, travelling through the flat plate 91 and the semitransparent film 12a and then entering a photodetector unit 7a.

The backward light beam 3a is modulated with recorded information on the information recording medium 5. In addition, the backward light beam 3a carries information representing a tracking error and a focusing error.

The photodetector unit 7a converts the received backward light beam 3a into a corresponding electric signal, from which servo control signals and an information signal are derived through signal processing.

Figure 2:
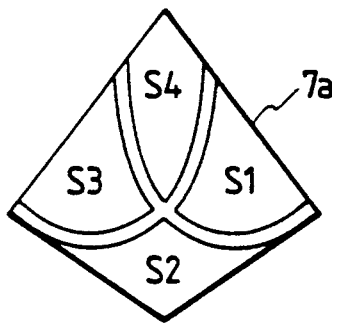
FIG. 2 is a plan view of the photodetector unit of FIG. 1.

As shown in FIG. 2, the photodetector unit 7a is of the four-segment type, including four separate photodetectors S1, S2, S3, and S4 of special non-square different shapes. The photodetectors S2 and S4 are symmetrical with respect to their central lines. The photodetectors S1 and S3 are symmetrical with respect to each other. A focusing servo control signal (a focusing error signal) FE is generated from output signals of the photodetectors S1, S2, S3, and S4 by using an astigmatism which results from the fact that the backward light beam 3a passes through the flat plate 91. Specifically, the focus servo control signal FE is generated according to the following adding and subtracting processes on the output signals of the photodetectors S1, S2, S3, and S4.

$$FE = (S1 + S3) - (S2 + S4) \tag{1}$$

where the characters S1, S2, S3, and S4 denote the output signals of the corresponding photodetectors respectively.

As understood from the previous description, the flat plate 91 is used as both a light beam splitting device and an astigmatism introducing device. This design reduces the number of parts.

In addition, a coma results from the fact that the backward light beam 3a passes through the flat plate 91. To suppress crosstalk between the focusing error signal and a tracking error signal which would be caused by the comma, the photodetector unit 7a has a non-square configuration as shown in FIG. 2.

The prior art optical pickup head of FIGS. 1 and 2 has problems as follows. If the backward light beam 3a relatively moves on the photodetector unit 7a due to a temperature variation or an ageing variation, considerable crosstalk between the focusing error signal and the tracking error signal tends to occur. Since the shapes of the photodetectors S1 and S3 are significantly different from the shapes of the photodetectors S2 and S4, the focusing error signal tends to have a large offset component responsive to stray light. The semitransparent film 12a reduces the efficiency of use of the light, and therefore S/N ratios relating to the servo control signals and the information signal tend to be low. The light source 2 and the photodetector 7a are located at the same side of the flat plate 91, and thus the objective lens 4 and the flat plate 91 need to be separated by a large distance along the vertical direction with respect to the information recording medium 5 in order to prevent stray light from entering the photodetector 7a. Therefore, the thickness of the optical pickup head tens to be large.

Figure 3:
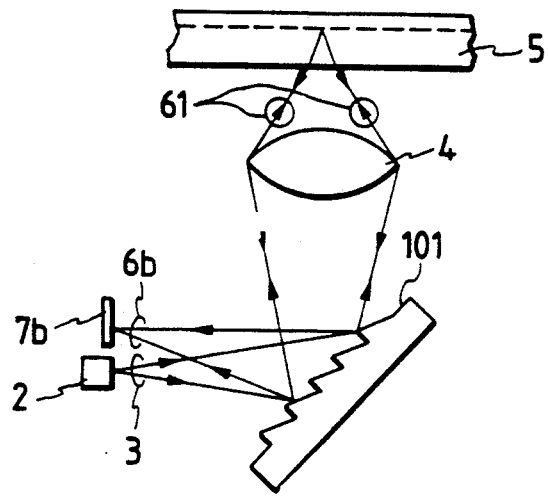
FIG. 3 is a diagram of a second prior art optical pickup head.

With reference to FIG. 3, a second prior art optical pickup head includes a light source 2 such as a semiconductor laser. The light source 2 applies a forward light beam 3 to a blazed reflection holographic optical element (a brazed reflection hologram) 101 which has a high surface reflectivity. The holographic optical element 101 reflects a portion of the forward light beam 3, generating a forward 0-order diffraction light beam 61. The forward 0-order diffraction light beam 61 is incident to an objective lens 4, and is focused by the objective lens 4 into a spot on an information recording medium 5.

The forward 0-order diffraction light beam 61 is reflected at the information recording medium 5, forming a backward 0-order diffraction light beam which moves back through the objective lens 4 and then reaches the holographic optical element 101. The holographic optical element 101 generates a backward +1-order diffraction light beam 6b from the backward 0-order diffraction light beam. The backward +1-order diffraction light beam 6b enters a photodetector unit 7b.

The backward +1-order diffraction light beam 6b is modulated with recorded information on the information recording medium 5. In addition, the backward +1-order diffraction light beam 6b carries information representing a tracking error and a focusing error.

The photodetector unit 7b converts the received backward +1-order diffraction light beam 6b into a corresponding electric signal, from which servo control signals and an information signal are derived through signal processing.

In general, the holographic optical element 101 is brazed so as to maximize the efficiency of use of light which is equal to the product of the quantity of the forward 0-order diffraction light 61 and the backward +1-order diffraction light 6b.

Since the wavefront of the +1-order diffraction light 6b can be freely designed, it is generally possible to suppress crosstalk between a focusing error signal and a tracking error signal without using a special-configuration photodetector unit, The prior art optical pickup head of FIG. 3 has problems as follows. For accurate servo control and accurate information readout, it is necessary to accurately and finely manufacture the holographic optical element 101. The holographic optical element 101 generates diffraction light beams having order numbers other than 0 and +1, and some of these diffraction light beams enter the photodetector unit 7a and cause noise in the servo control signals and the information signal.

DESCRIPTION OF THE FIRST PREFERRED EMBODIMENT

Figure 4:
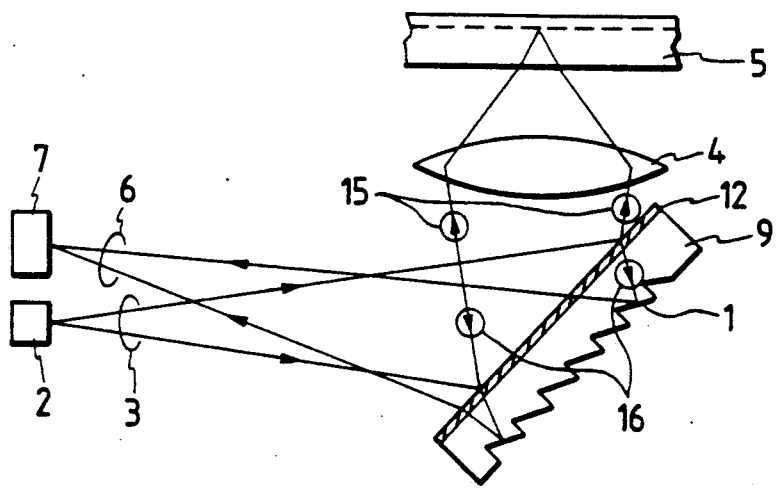
FIG. 4 is a diagram of an optical pickup head according to a first embodiment of this invention.

With reference to FIG. 4, an optical pickup head of a first embodiment of this invention includes a light source 2 such as a semiconductor laser. The light source 2 applies a forward light beam 3 to a semitransparent film 12. A portion of the forward light beam 3 is reflected at the semitransparent film 12, and then forms a forward light beam 15. The forward light beam 15 is incident to an objective lens 4, and is focused by the objective lens 4 into a spot on an information recording medium 5.

The semitransparent film 12a is formed on the front surface of a transparent base plate (an astigmatism introducing plate) 9. For example, the semitransparent film 12 includes a dielectric film or a vapor deposition film of aluminum. The rear surface of the base plate 9 is formed with a brazed holographic optical element (a blazed hologram) 1 coated with a total reflection film (not shown).

The forward light beam 15 is reflected at the information recording medium 5, forming a backward light beam 16 which moves back through the objective lens 4 and then enters the transparent base plate 9 via the semitransparent film 12. The backward light beam 16 advances in the transparent base plate 9, and then reaches the holographic optical element 1. The holographic optical element 1 generates a backward +1-order diffraction light beam 6 from the backward light beam 16. The backward +1-order diffraction light beam 6 moves back through the transparent base plate 9 and the semitransparent film 12, and then enters a photodetector unit 7.

The backward light beam 6 is modulated with recorded information on the information recording medium 5. In addition, the backward light beam 6 carries information representing a tracking error and a focusing error.

The photodetector unit 7 converts the received backward light beam 6 into a corresponding electric signal, from which servo control signals and an information signal are derived through signal processing.

Figure 6:
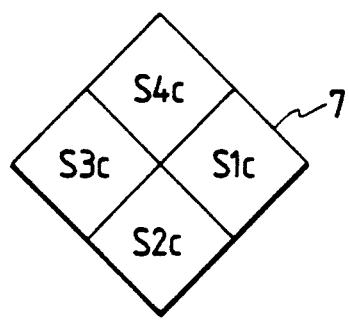
FIG. 6 is a plan view of the photodetector unit of FIG. 4.

As shown in FIG. 6, the photodetector unit 7 is of the four-segment type, including four separate photodetectors S1c, S2c, S3c, and S4c of a square shape. A focusing servo control signal (a focusing error signal) FE is generated from output signals of the photodetectors S1c, S2c, S3c, and S4c by using an astigmatism which results from the fact that the backward light beam 16 passes through the transparent base plate 9. Specifically, the focus servo control signal FE is generated according to the following adding and subtracting processes on the output signals of the photodetectors S1c, S2c, S3c, and S4c.

$$FE = (S1c + S3c) - (S2c + S4c) \tag{2}$$

where the characters S1c, S2c, S3c, and S4c denote the output signals of the corresponding photodetectors respectively.

Figure 5:
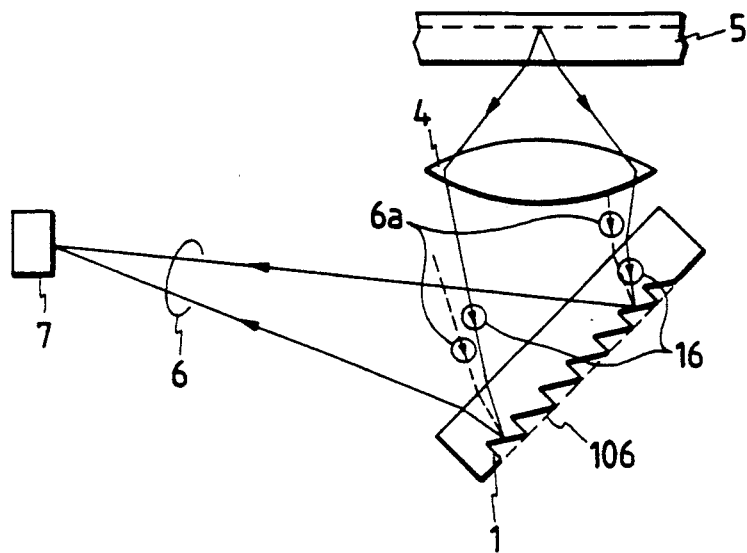
FIG. 5 is a diagram showing conditions under which the pattern on the hologram of FIG. 4 is made.

The holographic pattern (the grating pattern) of the holographic optical element 1 is made as follows. In FIG. 5, the numeral 16 denotes a backward light beam which results from the reflection of a forward light beam at an information recording medium 5, and the numeral 6 denotes a backward +1-order diffraction light beam. The holographic surface 106 is a plane to be formed with the holographic optical element 1. An object light beam 6a is a virtual light beam which is reflected at the holographic surface 106 and which forms the backward +1-order diffraction light beam. The fringes caused by the interference between the backward light beam 16 and the object light beam 6a are calculated. The holographic pattern of the holographic optical element 1 is generated in accordance with the calculated fringes. For example, a photomask having a pattern equal to the calculated interference fringes is formed, and the pattern is printed on the base plate by photolithography. The holographic optical element 1 may be made by a pattern writing method using an electron beam.

The optical pickup head of the first embodiment of this invention has advantages as follows. Since the holographic optical element 1 can compensate for a coma, crosstalk between the focusing error signal and the tracking error signal can be suppressed without using a non-square special-configuration photodetector unit of FIG. 2. Since the backward +1-order diffraction light 6 can be advanced in an arbitrary direction according to the design of the holographic optical system 1, the light source 2 and the photodetector unit 7 which are located at the same side of the transparent base plate 9 can operate while preventing stay light from entering the photodetector unit 7 even if the objective lens 4 and the transparent base plate 9 are made closer in the vertical direction with respect to the information recording medium 5. Thus, the optical pickup head can be thin. Since the forward light beam is reflected at the semitransparent film 12 and is focused on the information recording medium 5 before information is read out from the return light beam, the size of the spot of the light beam on the information recording medium 5 can be decreased to a diffraction limit regardless of the accuracy of the manufacture of the holographic optical element 1.

Figure 7:
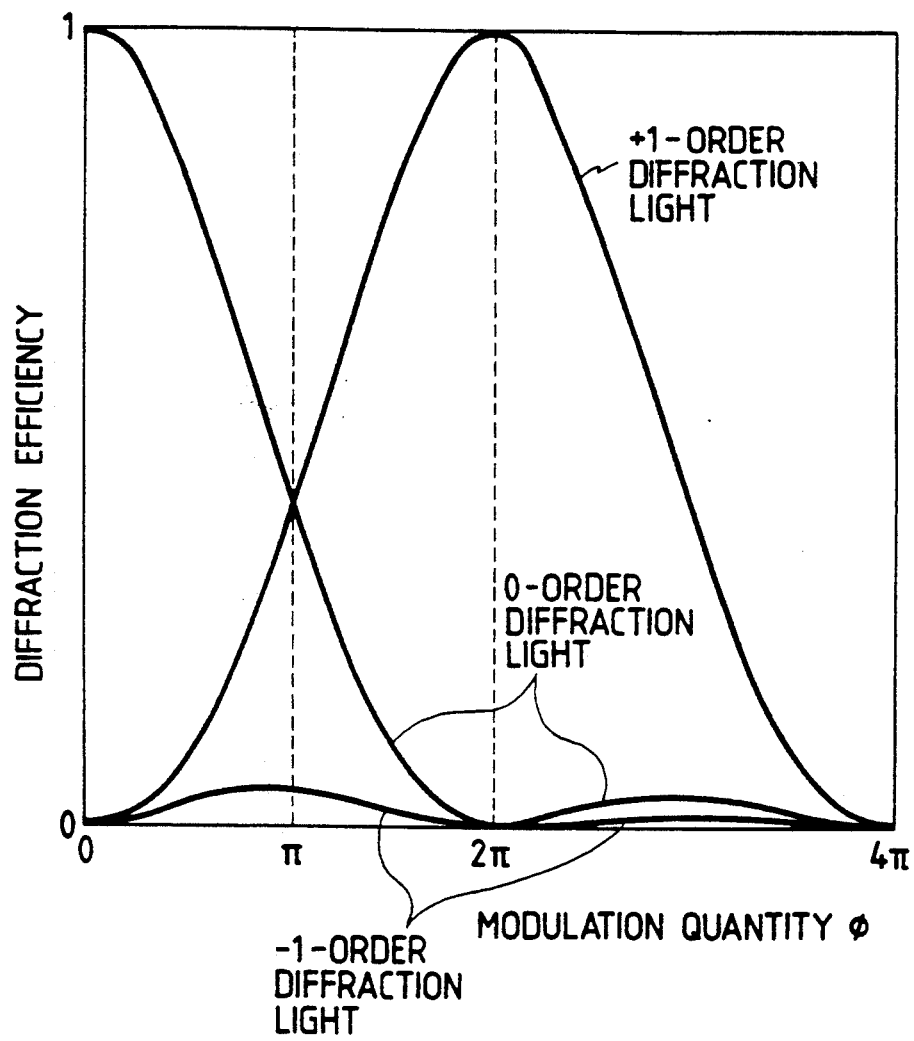
FIG. 7 is a diagram which shows the calculated ideal relations between the quantity $\phi$ of the phase modulation of light by a brazed holographic optical element and the efficiencies of diffraction related to 0-order diffraction light, +1-order diffraction light, and −1-order diffraction light.

The holographic optical element 1 is designed so as to maximize the efficiency of the diffraction related to the backward +1-order diffraction light beam 6. It is unnecessary to design the holographic optical element 1 so as to increase the strength of a 0-order diffraction light beam. Unnecessary diffraction light beams can be easily suppressed for the following reason. FIG. 7 shows the calculated ideal relations between the quantity $\phi$ of the phase modulation of light by a brazed holographic optical element and the efficiencies of diffraction related to 0-order diffraction light, +1-order diffraction light, and −1-order diffraction light. As shown in FIG. 7, the +1-order diffraction light is maximized when the phase modulation quantity $\phi$ is equal to $2\pi$. The diffraction efficiencies related to the 0-order diffraction light and the −1-order diffraction light are nullified and thus the 0-order diffraction light and the −1-order diffraction light are absent when the phase modulation quantity $\phi$ is equal to $2\pi$.

A portion of the forward light beam 3 passes through the semitransparent film 12. After the forward light beam passes through the semitransparent film 12, the light beam is subjected to reflection and diffraction at the holographic optical element 1, the information recording medium 5, and the semitransparent film 12 several times while passing through the transparent base plate 9 and the semitransparent film 12 several times. Then, only a very small portion of the light beam enters the photodetector unit 7. The light beam which enters the photodetector unit 7 does not carry the information signal since the related forward light beam is given an aberration by the transparent base plate 9 and is thus not focused on the information recording medium 5. In addition, the aberration widely spreads the light beam which enters the photodetector unit 7. Accordingly, the forward light beam which passes through the semitransparent film 12 is surely prevented from adversely affecting the servo control signals and the information signal.

DESCRIPTION OF THE SECOND PREFERRED EMBODIMENT

Figure 8:
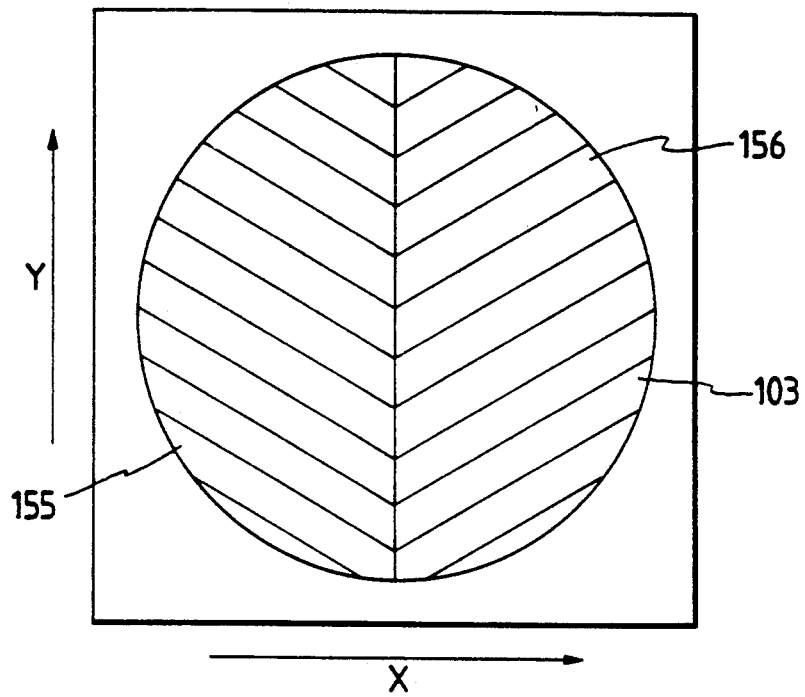
FIG. 8 is a plan view of a hologram in a second embodiment of this invention.

A second embodiment of this invention is similar to the embodiment of FIGS. 4-7 except for design changes indicated hereinafter. With reference to FIG. 8, the second embodiment includes a holographic optical element (a hologram) 103 in place of the holographic optical element 1 of FIG. 4. As shown in FIG. 8, the holographic optical element 103 has divided hologram regions 155 and 156. The regions 155 and 156 are capable of generating diffraction light beams having difference wavefronts respectively.

Figure 9:
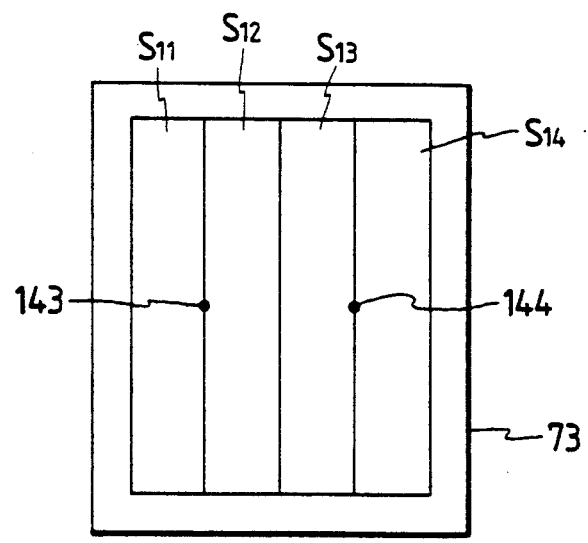
FIG. 9 is a plan view of a photodetector unit in the second embodiment.

With reference to FIG. 9, the second embodiment includes a photodetector unit 73 in place of the photodetector unit 7 of FIG. 4. As shown in FIG. 9, the photodetector unit 73 has separate four photodetectors S11, S12, S13, and S14 which have a strip shape and which extend parallel to each other. The photodetector S11 and S12 are exposed to the diffraction light beam 143 which is generated from the region 155 of the holographic optical element 103. The photodetectors S13 and S14 are exposed to the diffraction light beam 144 which is generated from the region 156 of the holographic optical element 103.

The photodetectors S11, S12, S13, and S14 convert the received diffraction light beams into corresponding electric signals. A focusing error signal FE is generated on the basis of the output signals of the photodetectors S11, S12, S13, and S14 according to the following equation.

$$FE = (S11 + S14) - (S12 + S13) \quad (3)$$

where the characters S11, S12, S13, and S14 denote the output signals of the corresponding photodetectors respectively.

During the preparation of the holographic pattern in the region 155 of the holographic optical element 103, the +1-order diffraction light beam 6 (see FIG. 5) is replaced by the diffraction light beam 143 (144). During the preparation of the holographic pattern in the region 156 of the holographic optical element 103, the diffraction light beam 144 is replaced by the +1-order diffraction light beam 6 of FIG. 5.

The generation of the focusing error signal FE is based on a double knife edge method which enables the focusing error signal to be very sensitive to a defocuses state.

DESCRIPTION OF THE THIRD PREFERRED EMBODIMENT

Figure 10:
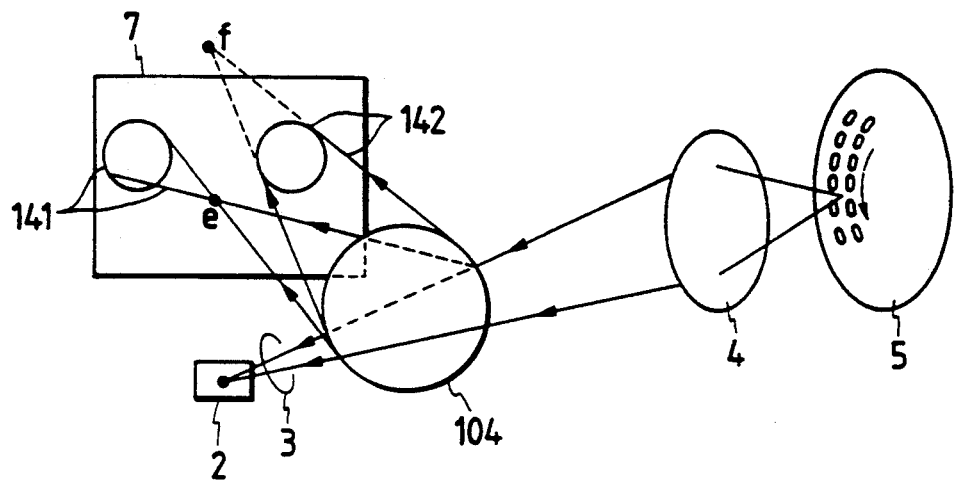
FIG. 10 is a diagram of an optical pickup head according to a third embodiment of this invention.

With reference to FIG. 10, an optical pickup head of a third embodiment of this invention includes a light source 2 such as a semiconductor laser. The light source 2 applies a forward light beam 3 to a blazed holographic optical element (a brazed hologram) 104. The forward light beam 3 passes through the holographic optical element 104, being incident to an objective lens 4 and being focused by the objective lens 4 into a spot on an information recording medium 5.

The forward light beam 3 is reflected at the information recording medium 5, forming a backward light beam which moves back through the objective lens 4 and then reaches the holographic optical element 104. The holographic optical element 104 generates backward +1-order diffraction light beams 141 and 142 from the incident backward light beam. The backward +1-order diffraction light beams 141 and 142 travel from the holographic optical element 104 to a photodetector unit 7.

The backward +1-order diffraction light beams 141 and 142 are composed of spherical waves having different radii of curvature respectively. The backward +1-order diffraction light beam 141 focuses on a point "e" in the front of the operating surface of the photodetector unit 7. The backward +1-order diffraction light beam 142 focuses on a point "f" in the rear of the operating surface of the photodetector unit 7.

Figure 11:
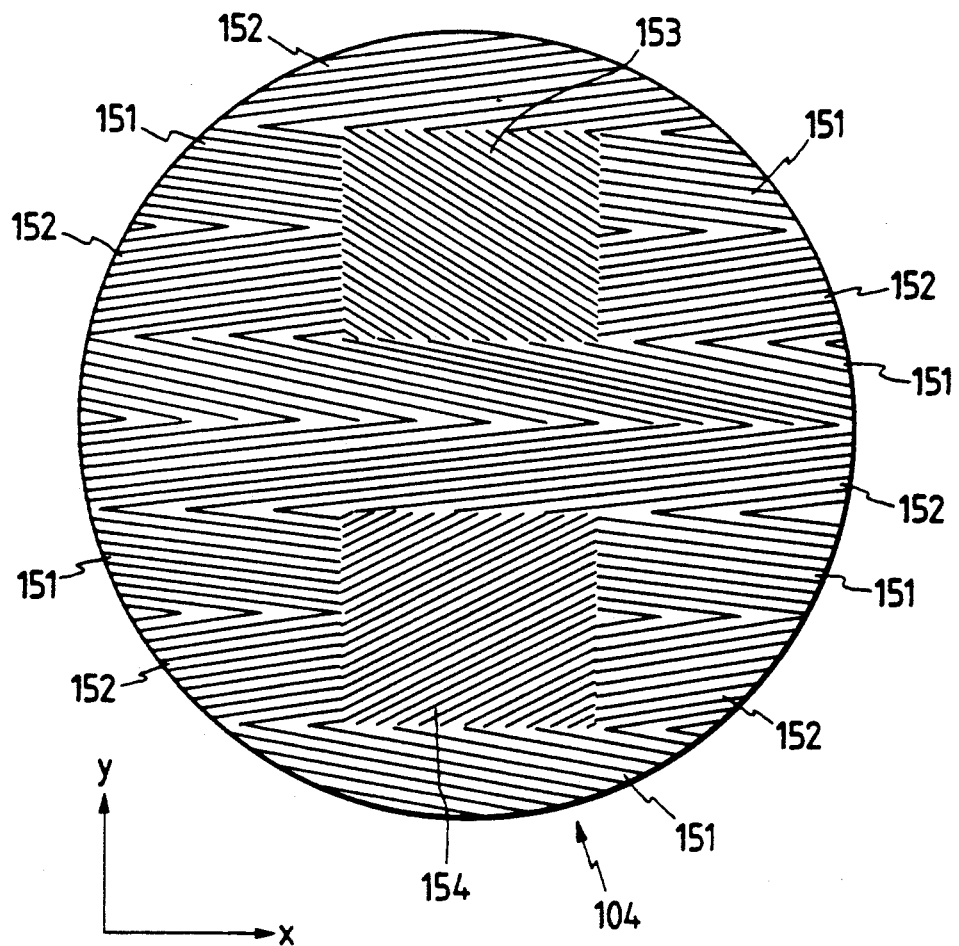
FIG. 11 is a plan view of a hologram of FIG. 10.

As shown in FIG. 11, the holographic optical element 104 is divided into holographic regions 151 of a first type, holographic regions 152 of a second type, a holographic region 153 of a third type, and a holographic region 154 of a fourth type. The first-type holographic regions 151 are designed so as to generate the backward +1-order diffraction light beam 141. The second-type holographic regions 152 are designed so as to generate the backward +1-order diffraction light beam 142.

The backward +1-order diffraction light beams 141 and 142 are modulated with recorded information on the information recording medium 5. In addition, the backward +1-order diffraction light beams 141 and 142 carry information representing a focusing error.

The photodetector unit 7 converts the received backward +1-order diffraction light beams 141 and 142 into corresponding electric signals, from which servo control signals and an information signal are derived through signal processing.

Figure 12:
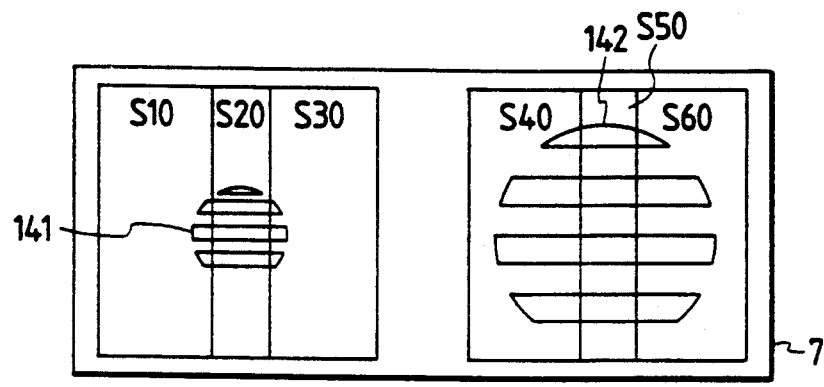
FIGS. 12–14 are plan views of the photodetector unit of FIG. 10.
Figure 13:
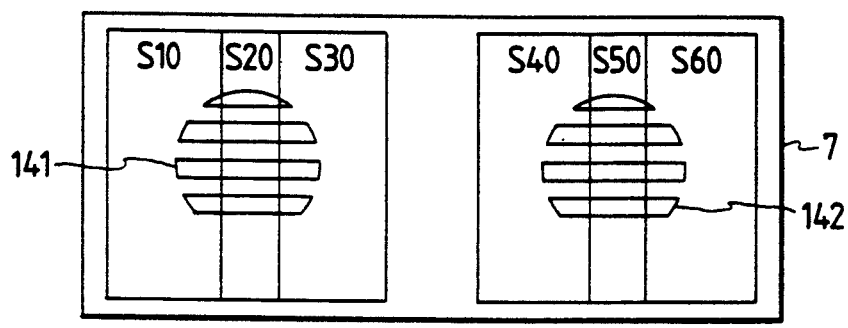
Figure 14:
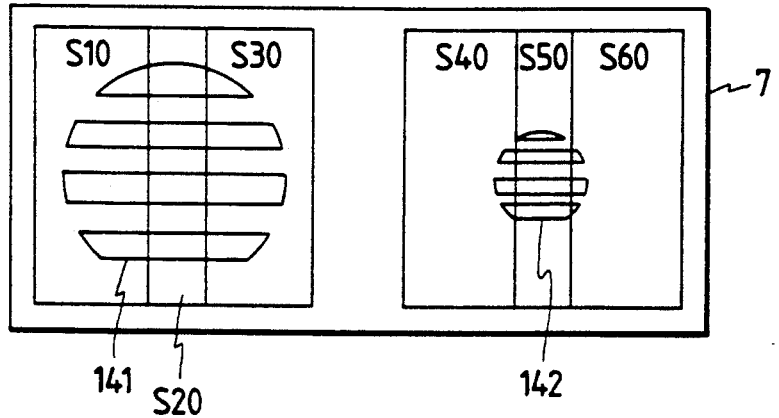

As shown in FIGS. 12-14, the photodetector unit 7 includes a first group of photodetectors S10, S20, and S30 for detecting the backward +1-order diffraction light beam 141, and a second group of photodetectors S40, S50, and S60 for detecting the backward +1-order diffraction light beam 142. Under a defocused condition in a first direction, the backward +1-order diffraction light beams 141 and 142 form approximately circles having different sizes respectively as shown in FIG. 12. Under a defocused condition in a second direction, the backward +1-order diffraction light beams 141 and 142 form approximately circles having different sizes respectively as shown in FIG. 14. Under a good focused condition, the backward +1-order diffraction light beams 141 and 142 form approximately circles having equal sizes respectively as shown in FIG. 13.

A focusing servo control signal (a focusing error signal) FE is generated from output signals of the photodetectors S10, S20, S30, S40, S50, and S60. Specifically, the focusing error signal FE is generated according to the following adding and subtracting processes on the output signals of the photodetectors S10, S20, S30, S40, S50, and S60.

$$FE = (S10 + S30 - S20) - (S40 + S60 - S50) \tag{4}$$

where the characters S10, S20, S30, S40, S50, and S60 denote the output signals of the corresponding photodetectors respectively.

The generation of the focusing error signal FE is based on a spot size detection method which enables large allowable errors in the assembly of the optical pickup head and which maintains a good stability of the servo control signal with respect to a variation in the wavelength of the light.

The division of the holographic optical element 104 into a plurality of the first-type holographic regions 151 and a plurality of the second-type holographic regions 152 enables stable focusing servo control characteristics.

DESCRIPTION OF THE FOURTH PREFERRED EMBODIMENT

Figure 15:
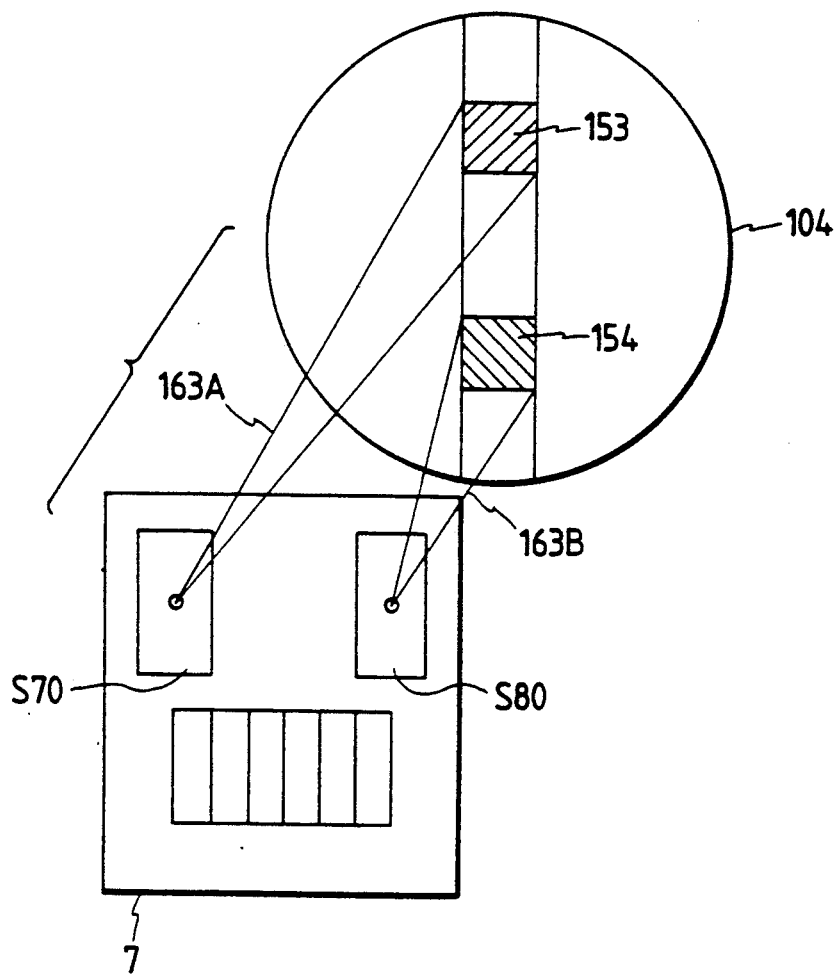
FIG. 15 is a diagram of a part of an optical pickup head according to a fourth embodiment of this invention.

A fourth embodiment of this invention is similar to the embodiment of FIGS. 10–14 except for an additional design indicated hereinafter. In the fourth embodiment, as shown in FIG. 15, a holographic optical element 104 has holographic regions 153 and 154. The holographic region 153 generates a diffraction light beam 163A from an incident backward light beam. The holographic region 154 generates a diffraction light beam 163B from the incident backward light beam. The diffraction light beams 163A and 163B travel from the holographic optical element 104 to a photodetector unit 7.

As shown in FIG. 15, the photodetector unit 7 has photodetectors S70 and S80 for detecting the diffraction light beams 163A and 163B respectively. The diffraction light beams 163A and 163B focus into spots on the photodetectors S70 and S80 respectively. A tracking error signal TE is generated according to the following subtracting process on output signals from the photodetectors S70 and S80.

$$TE = S70 - S80 \tag{5}$$

where the characters S70 and S80 denote the output signals of the corresponding photodetectors respectively.

DESCRIPTION OF THE FIFTH PREFERRED EMBODIMENT

A fifth embodiment of this invention is similar to the embodiment of FIGS. 4–7 except for a design change indicated hereinafter.

It is now assumed that a holographic optical element 1 is completely brazed and the efficiency of the diffraction relating to the +1-order diffraction light beam is equal to 1; an objective lens 4 and an information recording medium 5 do not provide any loss of a light quantity; and the aperture of the objective lens 4 does not provide any loss of a light quantity. In this case, the efficiency η of the use of the light is expressed as follows.

$$\eta = R \times (1-R)^2 \tag{6}$$

where the character R denotes the reflectivity of a semitransparent film 12.

Figure 16:
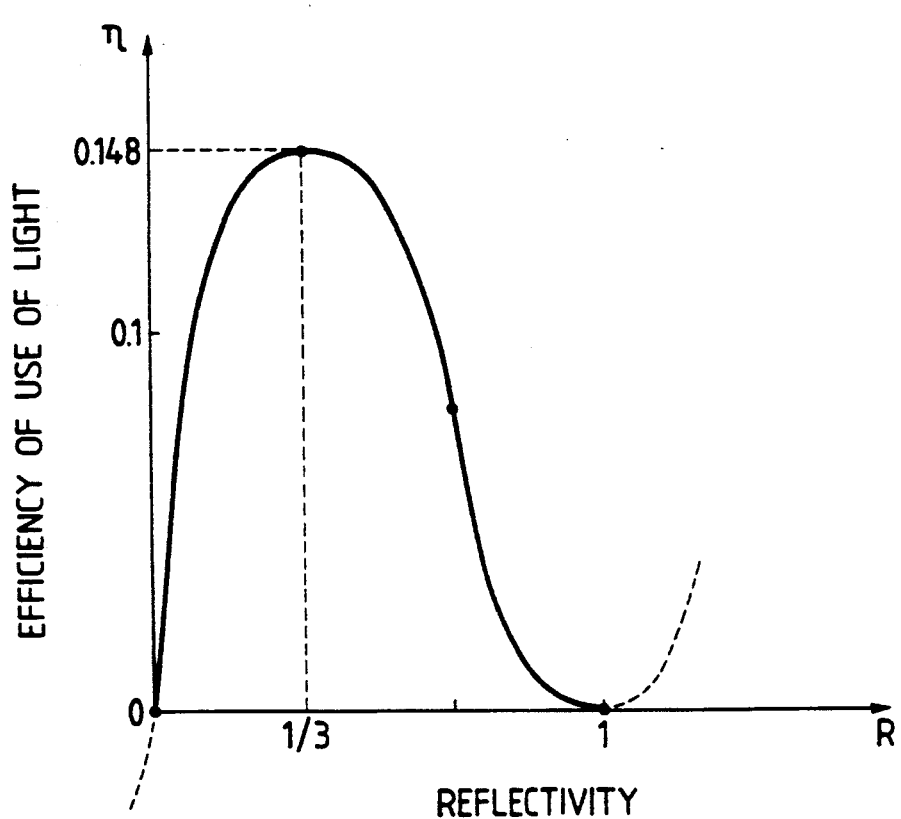
FIG. 16 is a diagram showing the relation between the reflectivity of a semitransparent film and the efficiency of use of light in respect of a fifth embodiment of this invention.

As shown in FIG. 16, the efficiency η of the use of the light is maximized when the reflectivity R is equal to ⅓. Accordingly, in the fifth embodiment, the reflectivity R of the semitransparent film 12 is set equal to ⅓ or around ⅓.

DESCRIPTION OF THE SIXTH PREFERRED EMBODIMENT

Figure 17:
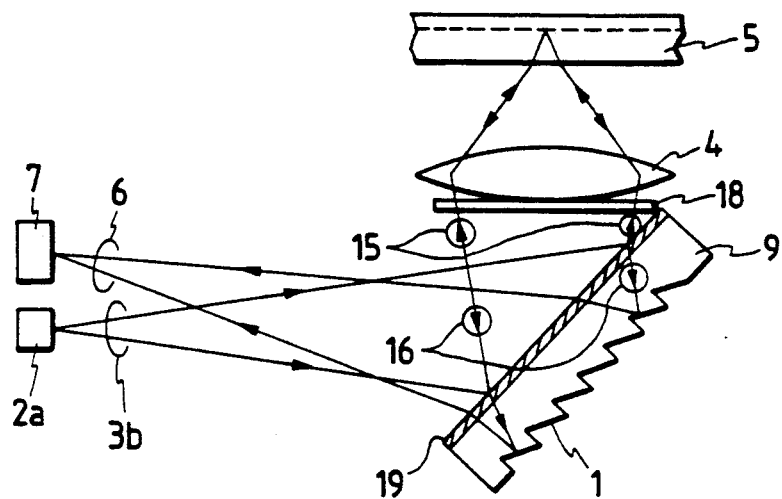
FIG. 17 is a diagram of an optical pickup head according to a sixth embodiment of this invention.

FIG. 17 shows a sixth embodiment of this invention which is similar to the embodiment of FIGS. 4–7 except for design changes indicated later. As shown in FIG. 17, the sixth embodiment includes a light source 2a such as a semiconductor laser which applies a forward linearly-polarized light beam 3b to a polarization reflecting film 19. The forward linearly-polarized light beam 3 is totally reflected at the polarization reflecting film 19, and then forms a forward linearly-polarized light beam 15. The polarization reflecting film 19 is designed so as to totally reflect light polarized in a first predetermined plane, and to conduct light polarized in a second predetermined plane perpendicular to the first predetermined plane. The forward linearly-polarized light beam 15 passes successively through a quarter-wave plate 18 and an objective lens 4, and is focused by the objective lens 4 into a spot on an information recording medium 5.

The polarization reflecting film 19 is formed on the front surface of a transparent base plate 9. The rear surface of the transparent base plate 9 is formed with a brazed holographic optical element (a brazed hologram) 1 coated with a total reflection film (not shown).

The forward light beam 15 is reflected at the information recording medium 5, forming a backward light beam 16 which moves back through the objective lens 4 and the quarter-wave plate 18 and then enters the transparent base plate 9 via the polarization reflecting film 19. The quarter-wave plate 18 changes or rotates the directions of the plane of the polarization of the forward light beam 15 and the backward light beam 16, thereby enabling the backward light beam 16 to be polarized in the direction of allowing the conduction through the polarization reflecting film 19. The backward light beam 16 advances in the transparent base plate 9, and then reaches the holographic optical element 1. The holographic optical element 1 generates a backward +1-order diffraction light beam 6 from the backward light beam 16. The backward +1-order diffraction light beam 6 moves back through the transparent base plate 9 and the polarization reflecting film 19, and then enters a photodetector unit 7.

The backward light beam 6 is modulated with recorded information on the information recording medium 5. In addition, the backward light beam 6 carries information representing a tracking error and a focusing error.

The photodetector unit 7 converts the received backward light beam 6 into a corresponding electric signal, from which servo control signals and an information signal are derived through signal processing.

It is now assumed that the holographic optical element 1 is completely brazed and the efficiency of the diffraction relating to the +1-order diffraction light beam is equal to 1; the objective lens 4 and the information recording medium 5 do not provide any loss of a light quantity; and the aperture of the objective lens 4 does not provide any loss of a light quantity. In this case, the efficiency $\eta$ of the use of the light is equal to 1 so that there is no loss of the light. In addition, diffraction light beams having order numbers other than +1 are prevented from entering the photodetector unit 7, and thus the servo control signals and the information signal can be detected at high S/N ratios.

DESCRIPTION OF THE SEVENTH PREFERRED EMBODIMENT

Figure 18:
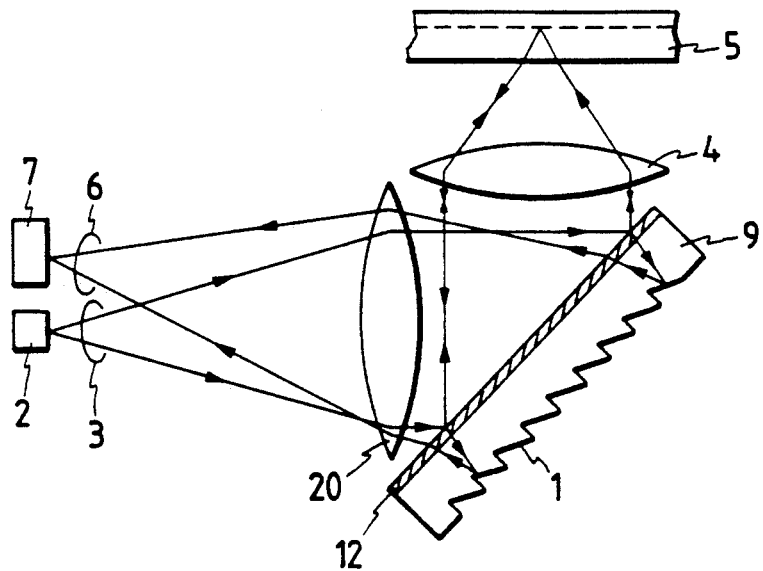
FIG. 18 is a diagram of an optical pickup head according to a seventh embodiment of this invention.

FIG. 18 shows a seventh embodiment of this invention which is similar to the embodiment of FIGS. 4-7 except for an additional design indicated hereinafter. As shown in FIG. 18, the seventh embodiment includes a collimating lens 20 disposed between a light source 2 and a semitransparent film 12, and between a photodetector unit 7 and the semitransparent film 12. A forward light beam 3 emitted from the light source 2 is made into parallel rays by the collimating lens 20 before reaching the semitransparent film 12. A backward +1-order light beam passes successively through the semitransparent film 12 and the collimating lens 20, being condensed on the photodetector unit 7 by the collimating lens 20.

The collimating lens 20 enables the forward light beam to be easily focused on an information recording medium 5. In addition, the collimating lens 20 makes uniform the backward +1-order diffraction light beam so that offset components of servo control signals can be limited to within acceptable levels.

DESCRIPTION OF THE EIGHTH PREFERRED EMBODIMENT

Figure 19:
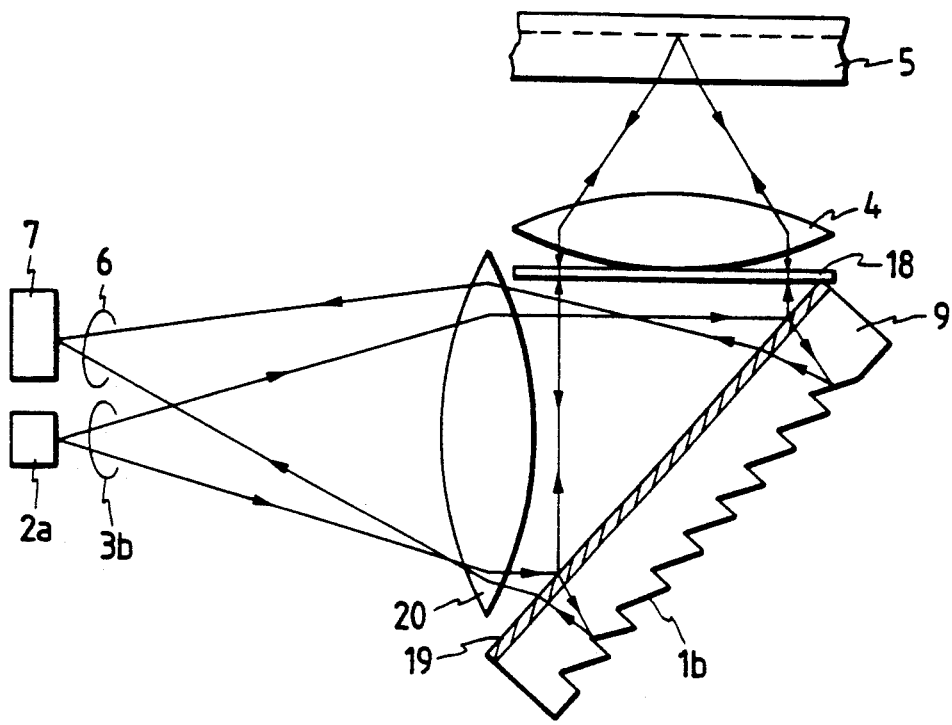
FIG. 19 is a diagram of an optical pickup head according to an eighth embodiment of this invention.

FIG. 19 shows an eighth embodiment of this invention which is similar to the embodiment of FIG. 17 except for an additional design indicated hereinafter. As shown in FIG. 19, the eighth embodiment includes a collimating lens 20 disposed between a light source 2a and a polarization reflecting film 19, and between a photodetector unit 7 and the polarization reflecting film 19. A forward light beam 3b emitted from the light source 2a is made into parallel rays by the collimating lens 20 before reaching the polarization reflecting film 19. A backward light beam passes successively through the polarization reflecting film 19 and the collimating lens 20, being condensed on the photodetector unit 7 by the collimating lens 20.

The collimating lens 20 enables the forward light beam to be easily focused on an information recording medium 5. In addition, the collimating lens 20 makes uniform the backward light beam so that offset components of servo control signals can be limited to within acceptable levels.

DESCRIPTION OF THE NINTH PREFERRED EMBODIMENT

Figure 20:
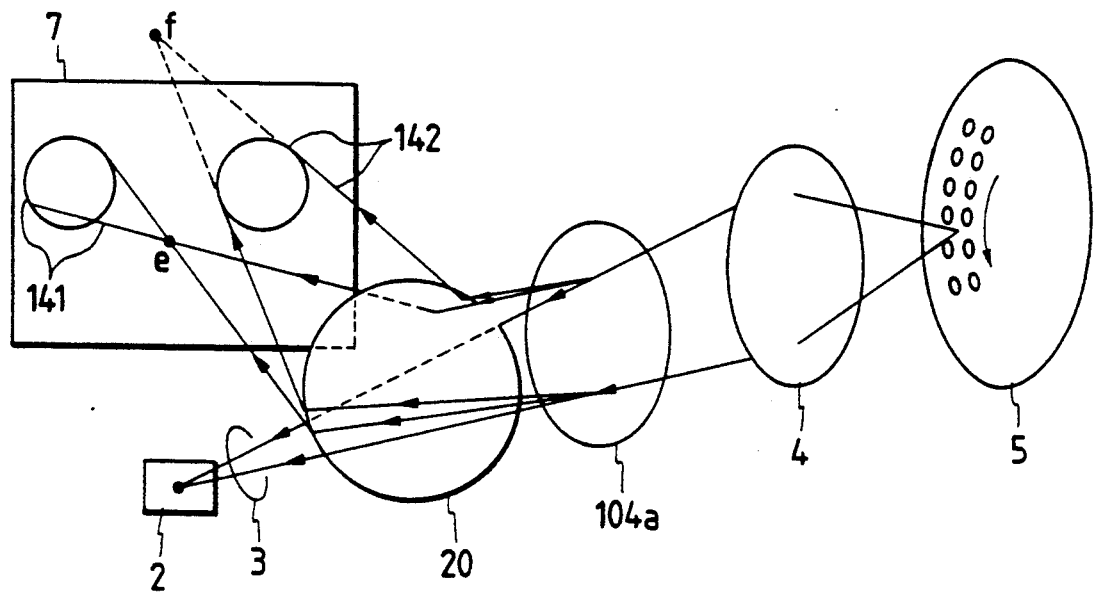
FIG. 20 is a diagram of an optical pickup head according to a ninth embodiment of this invention.

FIG. 20 shows a ninth embodiment of this invention which is similar to the embodiment of FIGS. 10-14 except that a collimating lens 20 is disposed between a holographic optical element 104a and a photodetector unit 7. The holographic optical element 104a corresponds to the holographic optical element 104 of FIG. 10. The collimating lens 20 operates similarly to the operation of the collimating lens in the embodiment of FIG. 18 or FIG. 19.

DESCRIPTION OF THE TENTH PREFERRED EMBODIMENT

Figure 21:
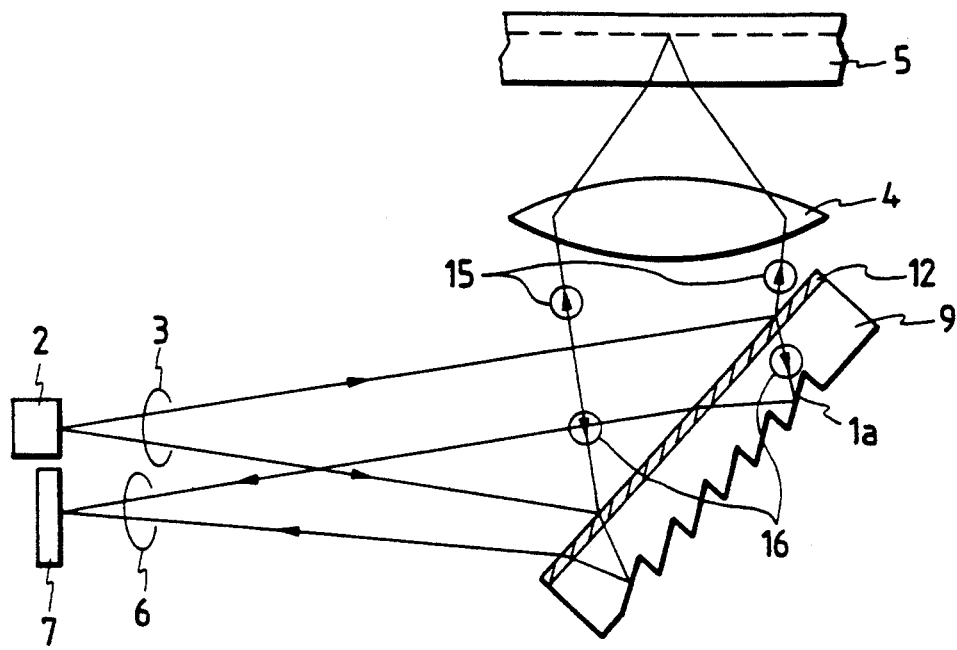
FIG. 21 is a diagram of an optical pickup head according to a tenth embodiment of this invention.

FIG. 21 shows a tenth embodiment of this invention which is similar to the embodiment of FIGS. 4-7 except for a design change indicated hereinafter. In the embodiment of FIG. 21, a holographic optical element 1a corresponding to the holographic optical element 1 of FIG. 4 is designed so that a light source 2 and a photodetector unit 7 can be exchanged in position relative to the case of FIG. 4.

DESCRIPTION OF THE ELEVENTH PREFERRED EMBODIMENT

Figure 22:
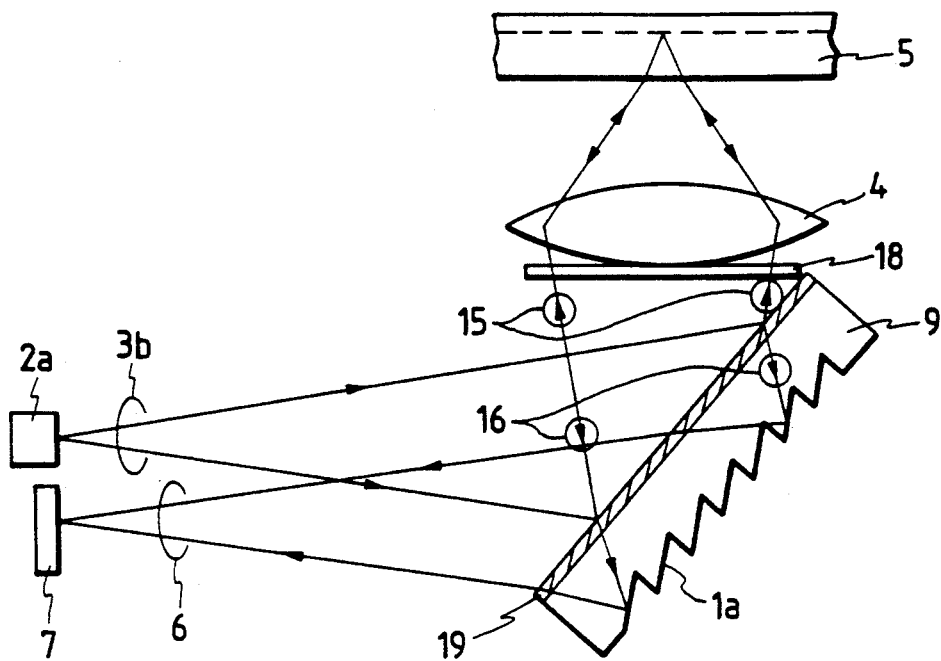
FIG. 22 is a diagram of an optical pickup head according to an eleventh embodiment of this invention.

FIG. 22 shows an eleventh embodiment of this invention which is similar to the embodiment of FIG. 17 except for a design change indicated hereinafter. In the embodiment of FIG. 22, a holographic optical element 1a corresponding to the holographic optical element 1 of FIG. 17 is designed so that a light source 2 and a photodetector unit 7 can be exchanged in position relative to the case of FIG. 17.

DESCRIPTION OF THE TWELFTH PREFERRED EMBODIMENT

Figure 23:
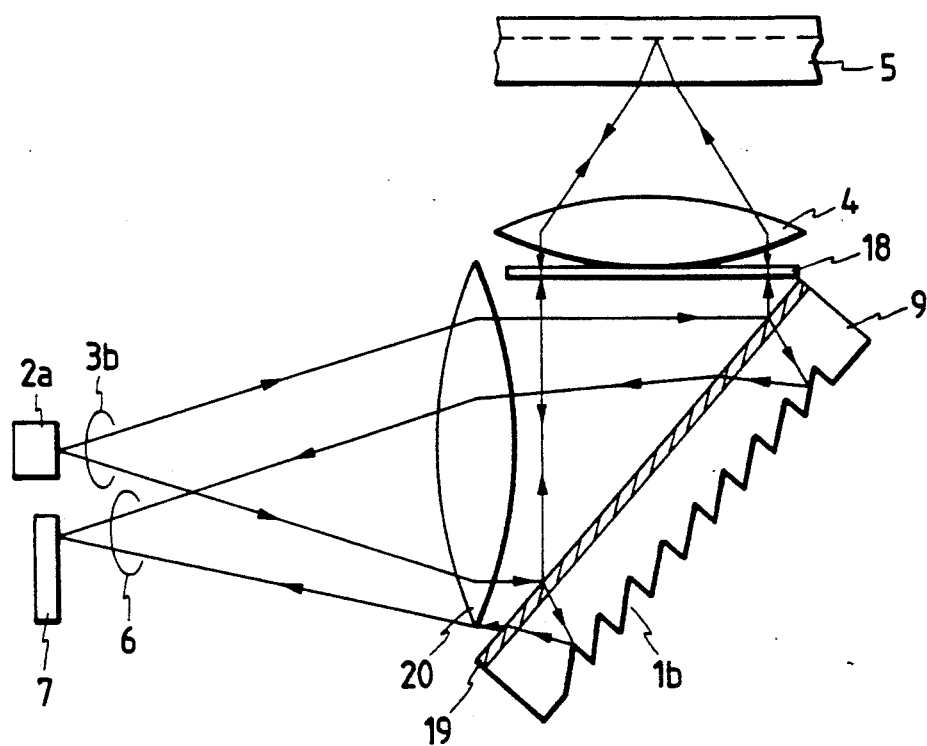
FIG. 23 is a diagram of an optical pickup head according to a twelfth eleventh embodiment of this invention.

FIG. 23 shows a twelfth embodiment of this invention which is similar to the embodiment of FIG. 17 except for design changes indicated hereinafter. The embodiment of FIG. 23 includes a collimating lens 20 disposed between a light source 2a and a polarization reflecting film 19, and between a photodetector unit 7 and the polarization reflecting film 19. In the embodiment of FIG. 23, a holographic optical element 1b corresponding to the holographic optical element 1 of FIG. 17 is designed so that the light source 2 and the photodetector unit 7 can be exchanged in position relative to the case of FIG. 17.

What is claimed is:

1. An optical pickup head for operating on an information recording medium, comprising:
   a light source for emitting a light beam;
   a transparent base plate having a semitransparent film formed only on one surface and a hologram formed only on an opposite surface, wherein the semitransparent film is exposed to the light beam emitted from the light source, and reflects a portion of the light beam emitted from the light source, wherein the portion of the light beam which is reflected by the semitransparent film forms a forward light beam;
   a condenser optical system for focusing the forward light beam on the information recording medium, wherein the forward light beam is reflected at the information recording medium, and forms a backward light beam;
   wherein the backward light beam successively passes through the condenser optical system, the semitransparent film, and the transparent base plate, and then reaches the hologram, and wherein the hologram generates a backward diffraction light beam from the backward light beam; and
   a plurality of photodetectors for receiving the diffraction light beam and converting the received diffraction light beam into corresponding electric signals respectively;

wherein the light source and the photodetectors are located on a same side of the transparent base plate which the semitransparent film faces.

2. The optical pickup head of claim 1, wherein the semitransparent film has a reflectivity equal to about ⅓ to maximize a light use efficiency.

3. The optical pickup head of claim 1, wherein the hologram has separated first and second regions, wherein the first region generates a backward diffraction light beam of spherical wave having a focal point frontward of operating surfaces of the photodetectors, and wherein the second region generates a backward diffraction light beam of spherical wave having a focal point rearward of the operating surfaces of the photodetectors.

4. The optical pickup head of claim 1, further comprising a collimating lens disposed between the light source and the semitransparent film and disposed between the semitransparent film and the photodetectors for making the light beam emitted from the light source into substantially parallel rays and for condensing the backward diffraction light beam on the photodetectors.

5. The optical pickup head of claim 1, wherein the backward diffraction light beam generated by the hologram includes two spherical waves having focal points frontward and rearward of operating surfaces of the photodetectors respectively.

6. An optical pickup head for operating on an information recording medium, comprising:
   a light source for emitting a linearly-polarized light beam;
   a transparent base plate having a polarization reflecting film formed only on one surface and a hologram formed only on an opposite surface, wherein the polarization reflecting film is exposed to the linearly-polarized light beam emitted from the light source, and essentially totally reflects the linearly-polarized light beam emitted from the light source, wherein the linearly-polarized light beam which is reflected by the polarization reflecting film forms a forward linearly-polarized light beam;
   a condenser optical system disposed between the polarization reflecting film and the information recording medium;
   a quarter-wave plate disposed between the polarization reflecting film and the information recording medium;
   wherein the forward linearly-polarized beam light is changed in polarity by the quarter-wave plate and is focused on the information recording medium by the condenser optical system, and is then reflected at the information recording medium and forms a backward light beam;
   wherein the quarter-wave plate changes the backward light beam in polarity to enable the backward light beam to pass through the polarization reflecting film;
   wherein the backward light beam passes through the condenser optical system, the quarter-wave plate, the polarization reflecting film, and the transparent base plate, and then reaches the hologram, and wherein the hologram generates a backward diffraction light beam from the backward light beam; and
   a plurality of photodetectors for receiving the diffraction light beam and converting the received diffraction light beam into corresponding electric signals respectively;
   wherein the light source and the photodetectors are located on a same side of the transparent base plate which the polarization reflecting film faces.

7. The optical pickup head of claim 4, wherein the hologram has separated first and second regions, wherein the first region generates a backward diffraction light beam of spherical wave having a focal point frontward of operating surfaces of the photodetectors, and wherein the second region generates a backward diffraction light beam of spherical wave having a focal point rearward of the operating surfaces of the photodetectors.

8. The optical pickup head of claim 6, further comprising a collimating lens disposed between the light source and the polarization reflecting film and disposed between the polarization reflecting film and the photodetectors for making the light beam emitted from the light source into substantially parallel rays and for condensing the backward diffraction light beam on the photodetectors.

9. The optical pickup head of claim 6, wherein the backward diffraction light beam generated by the hologram includes two spherical waves having focal points frontward and rearward of operating surfaces of the photodetectors respectively.

10. The optical pickup head of claim 6, further comprising a collimating lens disposed between the light source and the polarization reflecting film and disposed between the polarization reflecting film and the photodetectors for making the light beam emitted from the light source into substantially parallel rays and for condensing the backward diffraction light beam on the photodetectors, and wherein the backward diffraction light beam generated by the hologram includes a convergent wave and a divergent wave which are condensed by the collimating lens into two spherical waves having focal points frontward and rearward of operating surfaces of the photodetectors respectively.

* * * * *

UNITED STATES PATENT AND TRADEMARK OFFICE
CERTIFICATE OF CORRECTION

PATENT NO. : 5,301,182
DATED : April 5, 1994
INVENTOR(S) : Yoshiaki KOMMA et al.

It is certified that error appears in the above-indentified patent and that said Letters Patent is hereby corrected as shown below:

In column 14, line 19, change "4" to --6--.

Signed and Sealed this

Twenty-first Day of March, 1995

Attest:

BRUCE LEHMAN

Attesting Officer     Commissioner of Patents and Trademarks